（12） United States Patent
Fukawatase et al.

(10) Patent No.: US 11,691,588 B2
(45) Date of Patent: Jul. 4, 2023

(54) VEHICLE SIDE AIRBAG DEVICE AND OCCUPANT PROTECTION DEVICE

(71) Applicant: TOYOTA JIDOSHA KABUSHIKI KAISHA, Toyota (JP)

(72) Inventors: Osamu Fukawatase, Miyoshi (JP); Kazuhiro Kawamura, Toyota (JP); Yuto Ota, Toyota (JP); Yuta Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/505,985

(22) Filed: Oct. 20, 2021

(65) Prior Publication Data

US 2022/0126777 A1    Apr. 28, 2022

(30) Foreign Application Priority Data

Oct. 22, 2020   (JP) ................................. 2020-177573

(51) Int. Cl.
*B60R 21/207* (2006.01)
*B60R 21/18* (2006.01)
(Continued)

(52) U.S. Cl.
CPC ............ *B60R 21/207* (2013.01); *B60R 21/18* (2013.01); *B60R 21/233* (2013.01);
(Continued)

(58) Field of Classification Search
CPC . B60R 21/207; B60R 21/18; B60R 21/23138; B60R 21/233; B60R 21/261;
(Continued)

(56) References Cited

U.S. PATENT DOCUMENTS 6,010,150 A      1/2000 Amann
2006/0001244 A1  1/2006 Taguchi et al.
(Continued)

FOREIGN PATENT DOCUMENTS

CN   114174128 A  *  3/2022  ........... B60R 21/207
GB     2494968 A      3/2013
(Continued)

OTHER PUBLICATIONS

Shimizu et al. WO 2021/149576, Airbag Device, English Translation. (Year: 2021).*

*Primary Examiner* — Karen Beck
(74) *Attorney, Agent, or Firm* — Dinsmore & Shohl LLP

(57) ABSTRACT

A vehicle side airbag device including an inflator, a side airbag, and a duct is installed at a side section on a vehicle width direction outer side of a seatback of a vehicle seat configured to restrain an occupant using a three-point seatbelt. The side airbag receives a supply of gas from the inflator in a vehicle side-on collision. As a result, a waist chamber is inflated and deployed from a lower portion of the side section toward a side of a waist of the occupant, and a head chamber is inflated and deployed from an upper face side of the side section toward a side of a head of the occupant. The duct extends along a vertical direction of the (Continued)

side airbag inside the side airbag, and is configured to guide gas from the inflator into the waist chamber and into the head chamber.

14 Claims, 5 Drawing Sheets

(51) Int. Cl.
    *B60R 21/231*     (2011.01)
    *B60R 21/233*     (2006.01)
    *B60R 21/261*     (2011.01)
    *B60R 21/00*     (2006.01)

(52) U.S. Cl.
    CPC ...... *B60R 21/23138* (2013.01); *B60R 21/261* (2013.01); *B60R 2021/0006* (2013.01); *B60R 2021/23146* (2013.01); *B60R 2021/2612* (2013.01)

(58) Field of Classification Search
    CPC .. B60R 2021/0006; B60R 2021/23146; B60R 2021/2612; B60R 2021/23308; B60R 21/2346; B60R 2021/0048; B60R 2021/0055
    See application file for complete search history.

(56) References Cited

U.S. PATENT DOCUMENTS

| | | | |
|---|---|---|---|
| 2012/0126518 A1* | 5/2012 | Fukawatase | B60R 21/207 |
| | | | 280/730.2 |
| 2013/0229003 A1* | 9/2013 | Fukawatase | B60R 21/233 |
| | | | 280/730.2 |
| 2015/0115583 A1 | 4/2015 | Azuma et al. | |
| 2015/0158453 A1 | 6/2015 | Fujiwara | |
| 2016/0096504 A1 | 4/2016 | Fujiwara | |

FOREIGN PATENT DOCUMENTS

| | | |
|---|---|---|
| JP | H10273010 A | 10/1998 |
| JP | 2001-502987 A | 3/2001 |
| JP | 2011-005908 A | 1/2011 |
| JP | 2011-105107 A | 6/2011 |
| JP | 2013-233863 A | 11/2013 |
| JP | 2014-133462 A | 7/2014 |
| JP | 2022111674 A * | 8/2022 |
| WO | 2011016107 A1 | 2/2011 |
| WO | WO-2021149576 A1 * | 7/2021 |

* cited by examiner

VEHICLE SIDE AIRBAG DEVICE AND OCCUPANT PROTECTION DEVICE

CROSS-REFERENCE TO RELATED APPLICATION

This application is based on and claims priority under 35 USC 119 from Japanese Patent Application No. 2020-177573 filed on Oct. 22, 2020, the disclosure of which is incorporated by reference herein.

BACKGROUND

Technical Field

The present disclosure relates to a vehicle side airbag device and an occupant protection device including this vehicle side airbag device.

Related Art

Japanese Patent Application Laid-Open (JP-A) No. 2011-105107 discloses a vehicle side airbag device installed at a side section on a vehicle width direction outer side of a seatback of a vehicle seat. In this vehicle side airbag device, an inflator and an inner tube (duct) are accommodated inside a side airbag including a head protection inflatable section (head chamber) and a waist protection inflatable section (waist chamber). In a vehicle side-on collision, gas generated by the inflator is supplied into the head chamber and the waist chamber via the duct. The head chamber accordingly inflates and deploys at a side of the head of an occupant, and the waist chamber inflates and deploys at a side of the waist region of the occupant. International Publication (W/O) No. 2011/016107 also discloses similar technology.

SUMMARY

The above related art does not discuss any relationship between the side airbag and a seatbelt. In cases in which a general three-point seatbelt is employed, each of the side airbags in the above related art inflates and deploys at a vehicle width direction outer side of a shoulder belt of this seatbelt. In such cases, the head chamber of the side airbag inflates and deploys spaced apart from and at the vehicle width direction outer side of the head of the occupant. Accordingly, a time lag arises before the head is restrained by the head chamber. There is therefore room for improvement from the perspective of enhancing initial head restraint performance.

In consideration of the above circumstances, the present disclosure obtains a vehicle side airbag device and an occupant protection device capable of enhancing initial head restraint performance.

A vehicle side airbag device of a first aspect of the present disclosure is installed at a side section on a vehicle width direction outer side of a seatback of a vehicle seat configured to restrain an occupant using a three-point seatbelt. The vehicle side airbag device includes an inflator, a side airbag, and a duct. The inflator is configured to generate gas in a vehicle side-on collision. The side airbag includes a waist chamber configured to inflate and deploy from a lower portion of the side section toward a side of a waist of the occupant on receiving a supply of gas from the inflator, and a head chamber configured to inflate and deploy from an upper face side of the side section toward a side of a head of the occupant on receiving a supply of gas from the inflator. The duct extends along a vertical direction of the side airbag inside the side airbag, and is configured to guide gas from the inflator into the waist chamber and into the head chamber.

In the first aspect, the occupant is restrained in the vehicle seat using the three-point seatbelt. The vehicle side airbag device is installed at the side section at the vehicle width direction outer side of the seatback of the vehicle seat. In this vehicle side airbag device, gas is generated by the inflator in a vehicle side-on collision, and the gas is supplied to the side airbag. When this occurs, gas from the inflator is guided into the waist chamber (into a lower portion chamber) and into the head chamber (into an upper portion chamber) of the side airbag via the duct that extends along the vertical direction of the side airbag inside the side airbag. As a result, the waist chamber inflates and deploys toward the side of the waist of the occupant from the lower portion of the side section, and the head chamber inflates and deploys toward the side of the head of the occupant from the upper face side of the side section. As a result of providing the duct, the force of gas from the inflator is more readily applied to the head chamber, facilitating inflation and deployment of the head chamber from the upper face side of the side section. The head chamber is more readily inflated and deployed further toward a vehicle width direction inner side (i.e. further toward the head of the occupant) than a shoulder belt of a seatbelt as a result. This enables an inflation and deployment position of the head chamber to be brought closer to the head of the occupant, thereby enabling initial head restraint performance to be enhanced. Note that the side section is a location at the vehicle width direction outer side of the seatback that includes a side support section at the vehicle width direction outer side. The upper face of the side section configures part of an upper face of the seatback.

A vehicle side airbag device of a second aspect of the present disclosure is the first aspect, wherein an upper side ejection port is formed at an upper end portion of the duct so as to open into the head chamber and to open further toward the head of the occupant than a shoulder belt of the seatbelt during inflation and deployment of the side airbag.

In the second aspect, the upper side ejection port of the duct opens into the head chamber and opens further toward the head of the occupant than the shoulder belt of the seatbelt during inflation and deployment of the side airbag. The force of gas ejected into the head chamber through the upper side ejection port is applied to the head chamber that is further toward the head of the occupant than the shoulder belt. This further facilitates inflation and deployment of the head chamber further toward the head of the occupant than the shoulder belt.

A vehicle side airbag device of a third aspect of the present disclosure is the second aspect, wherein the upper side ejection port of the duct is set so as to open at a space between a side face of a headrest of the vehicle seat, the shoulder belt, and an upper end portion of the side section during inflation and deployment of the side airbag.

In the third aspect, the upper side ejection port of the duct opens in the space between the side face of the headrest of the vehicle seat, the shoulder belt of the seatbelt, and the upper end portion of the side section at the vehicle width direction outer side of the seatback during inflation and deployment of the side airbag. The head chamber inflates and deploys under the force of gas ejected through the upper side ejection port, thereby further facilitating inflation and deployment of the head chamber further toward the head of the occupant than the shoulder belt.

A vehicle side airbag device of a fourth aspect of the present disclosure is the second aspect, wherein the upper side ejection port of the duct is set so as to be positioned adjacent to a stay of a headrest during inflation and deployment of the side airbag.

In the fourth aspect, the upper side ejection port of the duct is positioned adjacent to the stay of the headrest of the vehicle seat during inflation and deployment of the side airbag. The head chamber inflates and deploys under the force of gas ejected through the upper side ejection port, thereby making it easier to set the inflation and deployment position of the head chamber closer to the head of the occupant.

A vehicle side airbag device of a fifth aspect of the present disclosure is the first aspect, wherein a lower side ejection port is formed at a lower end portion of the duct so as to open into the waist chamber during inflation and deployment of the side airbag.

In the fifth aspect, the lower side ejection port of the duct opens into the waist chamber during inflation and deployment of the side airbag. This enables the waist chamber to be inflated and deployed at an early stage under the force of gas ejected through the lower side ejection port. This enables initial waist restraint performance by the waist chamber to be enhanced as a result.

A vehicle side airbag device of a sixth aspect of the present disclosure is the fifth aspect, wherein the lower side ejection port is set such that the entire lower side ejection port is positioned at the side of the waist of the occupant during inflation and deployment of the side airbag.

In the sixth aspect, the entire lower side ejection port of the duct is positioned at the side of the waist of the occupant during inflation and deployment of the side airbag. This enables the waist chamber to be inflated and deployed between the waist and a vehicle body side section at an early stage under the force of gas ejected through the lower side ejection port.

A vehicle side airbag device of a seventh aspect of the present disclosure is the first aspect, wherein the side airbag is housed inside the side section in a folded state. In a housed state of the side airbag, a location including the head chamber extends from a shoulder part of the seatback toward a headrest.

In the seventh aspect, in a state in which the side airbag is housed and folded inside the side section at the vehicle width direction outer side of the seatback, the location including the head chamber extends from the shoulder part of the seatback toward the headrest. By housing the head chamber in this manner, the head chamber that inflates and deploys from the upper face side of the side section more readily inflates and deploys further toward the vehicle width direction inner side than the shoulder belt of the seatbelt.

A vehicle side airbag device of an eighth aspect of the present disclosure is the seventh aspect, wherein the duct is arranged so as to bend at a height of the shoulder part of the seatback during inflation and deployment of the side airbag. A cross-section area of a location of the duct further toward an upper end side than a location of the bend is set smaller than a cross-section area of a location of the duct further toward a lower end side than the location of the bend.

In the eighth aspect, the duct bends at the height of the shoulder part of the seatback during inflation and deployment of the side airbag. The cross-section area of the location of the duct further toward the upper end side than the location of the bend is set smaller than the cross-section area of the location of the duct further toward the lower end side than the location of the bend. The duct bends more readily at the location of the bend as a result, making it easier to bring the location at the upper end side of the duct closer to the head of the occupant.

A vehicle side airbag device of a ninth aspect of the present disclosure is the second aspect, wherein the upper side ejection port of the duct is set so as to open obliquely toward a vehicle upper-front side during inflation and deployment of the side airbag.

In the ninth aspect, the upper side ejection port formed at the upper end portion of the duct opens obliquely toward the vehicle upper-front side inside the head chamber during inflation and deployment of the side airbag. This enables the head chamber to be inflated and deployed obliquely toward the vehicle upper-front side from the upper face side of the side section at the vehicle width direction outer side of the seatback under the force of gas ejected through the upper side ejection port. This assists early inflation and deployment of the head chamber toward the side of the head of the occupant.

A vehicle side airbag device of a tenth aspect of the present disclosure is the fifth aspect, wherein the lower side ejection port of the duct is set so as to open toward a vehicle lower side during inflation and deployment of the side airbag.

In the tenth aspect, the lower side ejection port formed at the lower end portion of the duct opens toward the vehicle lower side inside the waist chamber during inflation and deployment of the side airbag. This assists early inflation and deployment of the waist chamber in a narrow gap between waist of the occupant and the vehicle body side section under the force of gas ejected through the lower side ejection port.

A vehicle side airbag device of an eleventh aspect of the present disclosure is the first aspect, wherein the inflator is fixed to a side frame of the seatback, a connecting portion extending from the duct is connected to a gas ejection portion of the inflator, and the duct extends along a height direction of the seatback further toward a vehicle front side than the inflator during inflation and deployment of the side airbag.

In the eleventh aspect, the inflator is fixed to the side frame of the seatback. The connecting portion that extends from the duct is connected to the gas ejection portion of the inflator. Gas from the inflator is introduced into the duct in this manner. The duct extends along the height direction of the seatback further toward the vehicle front side than the inflator during inflation and deployment of the side airbag. The duct is at a relatively high pressure inside the side airbag due to gas being introduced into the duct from the inflator. Since the high pressure duct extends in the above-described manner, for example a rear part of the ribs of the occupant can be more effectively restrained by the duct.

A vehicle side airbag device of a twelfth aspect of the present disclosure is the eleventh aspect, wherein the inflator is a cylinder-type inflator arranged with an orientation such that an axial direction of the inflator runs along the height direction of the seatback, the gas ejection portion is provided at a lower end portion of the inflator, and the connecting portion of the duct extends from a lower end portion side of the duct.

In the twelfth aspect, the connecting portion that extends from the lower end portion side of the duct is connected to the gas ejection portion provided at the lower end portion of the inflator. Thus, gas from the inflator is supplied into the waist chamber via the duct at an early stage. This enables the waist chamber to be inflated and deployed at an earlier stage than the head chamber, such that the waist chamber is more readily inflated and deployed at an early stage in the narrow gap between the waist of the occupant and the vehicle body side section.

An occupant protection device of a thirteenth aspect of the present disclosure includes a vehicle seat including a seat cushion and a seatback, a vehicle seatbelt device including a three-point seatbelt configured to restrain an occupant in the vehicle seat, and the vehicle side airbag device of the first aspect installed at a side section at a vehicle width direction outer side of the seatback.

In the thirteenth aspect, the occupant in the vehicle seat including the seat cushion and the seatback is restrained using the three-point seatbelt included in the vehicle seatbelt device. The vehicle side airbag device is installed at the side section at the vehicle width direction outer side of the seatback. This vehicle side airbag device is configured by the first aspect, and so the above-described operation and effects are obtained.

As described above, the vehicle side airbag device and the occupant protection device according to the present disclosure are capable of enhancing initial head restraint performance.

BRIEF DESCRIPTION OF THE DRAWINGS

Exemplary embodiments of the present disclosure will be described in detail based on the following figures, wherein.

DETAILED DESCRIPTION

Figure 1:
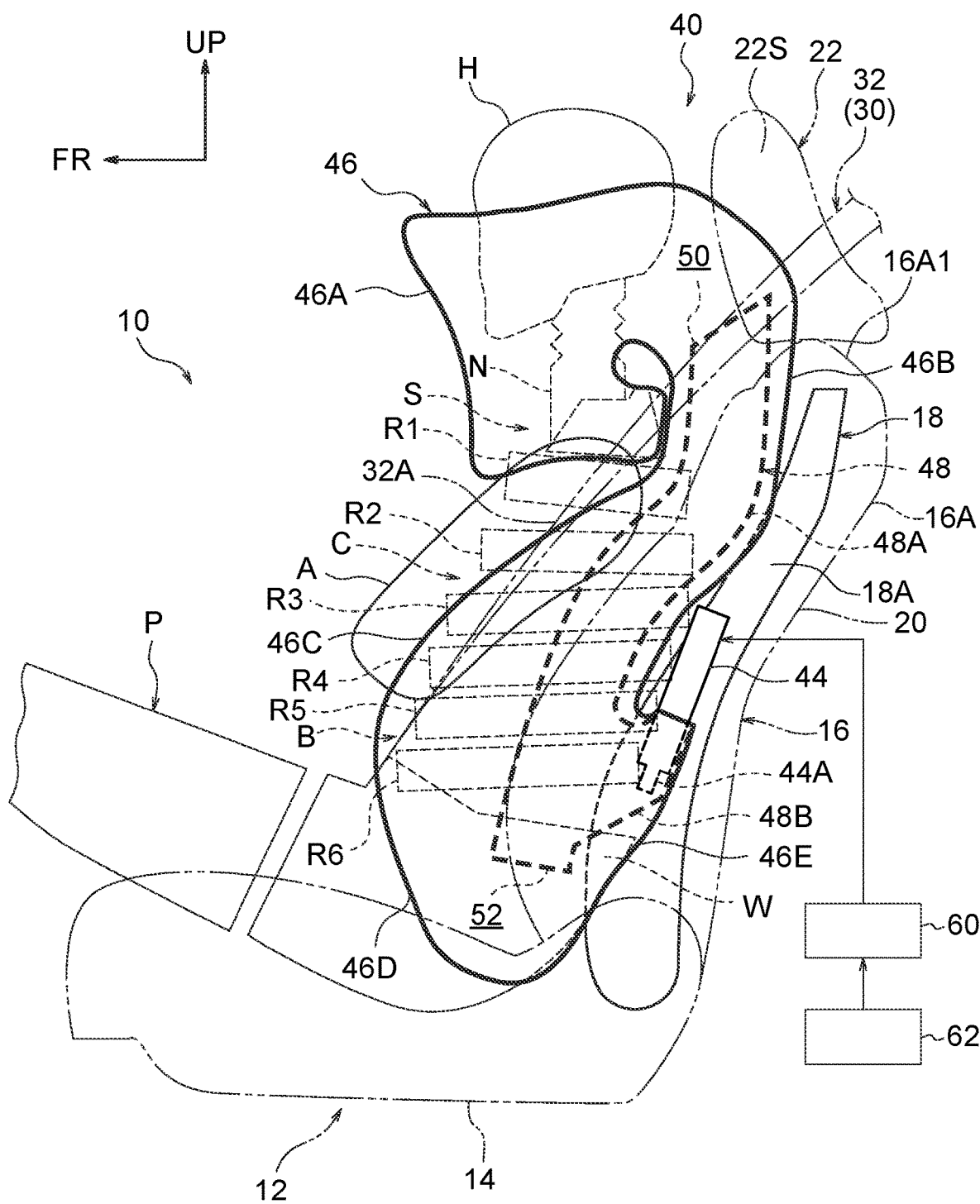
FIG. 1 is a side view illustrating a side airbag in an inflated and deployed state in an occupant protection device according to an exemplary embodiment.

Explanation follows regarding an occupant protection device 10 according to an exemplary embodiment of the present disclosure, with reference to FIG. 1 to FIG. 5. Note that in the drawings, the arrow FR indicates a vehicle forward direction, the arrow UP indicates a vehicle upward direction, and the arrow LH (OUT) indicates a vehicle leftward direction (a vehicle width direction outer side). In the following explanation, unless specifically stated otherwise, reference to front and rear, left and right, and upward and downward directions refers to the front and rear in a vehicle front-rear direction, left and right in a vehicle left-right direction (vehicle width direction), and upward and downward in a vehicle vertical direction.

Figure 2:
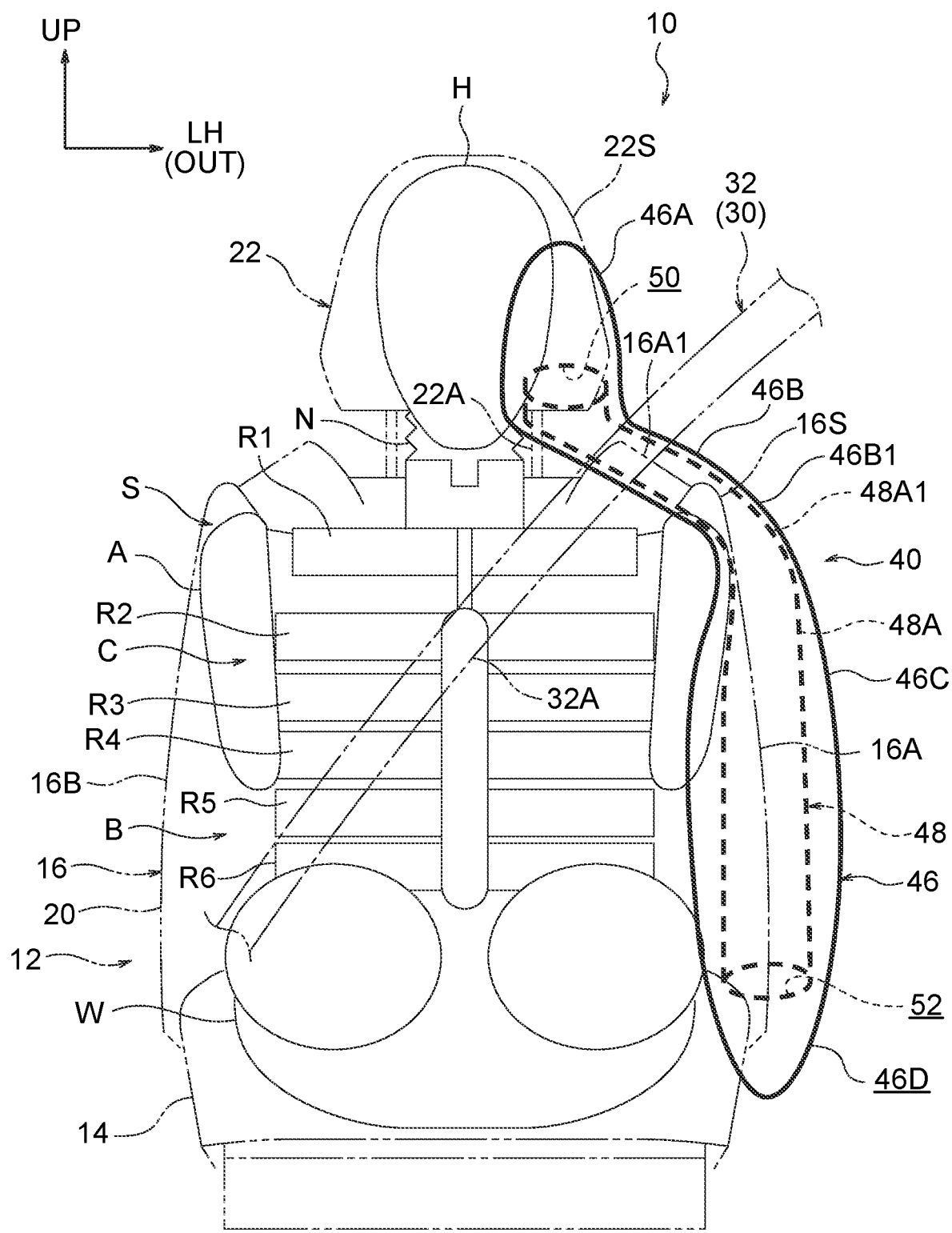
FIG. 2 is a front view illustrating a side airbag in an inflated and deployed state in an occupant protection device according to an exemplary embodiment.

As illustrated in FIG. 1 and FIG. 2, the occupant protection device 10 according to the present exemplary embodiment is configured by a vehicle seat 12, a vehicle seatbelt device 30, and a vehicle side airbag device 40. The vehicle seat 12 is, for example, disposed on a left side inside a vehicle cabin, and is a driver's seat in the case of a left hand drive vehicle, or a front passenger seat in the case of a right hand drive vehicle. A front-rear direction, left-right direction (width direction), and vertical direction of the vehicle seat 12 are aligned with the front-rear direction, left-right direction (width direction), and vertical direction of the vehicle. In cases in which the vehicle seat 12 is disposed on the right side inside the vehicle cabin, the configuration of the present exemplary embodiment is inverted with left-right symmetry. Explanation follows regarding configuration of the vehicle seat 12, the vehicle seatbelt device 30, and the vehicle side airbag device 40 in sequence, followed by explanation regarding relevant portions of the present exemplary embodiment.

Vehicle Seat Configuration

As illustrated in FIG. 1 and FIG. 2, the vehicle seat 12 includes a seat cushion 14 that supports the buttocks and thighs of an occupant P seated on the vehicle seat 12, a seatback 16 that is coupled to a rear end portion of the seat cushion 14 and that supports the back of the occupant P, and a headrest 22 that is coupled to an upper end portion of the seatback 16 and that supports the head H of the occupant P.

Note that in FIG. 1 and FIG. 2, a crash test dummy P is seated on the vehicle seat 12 in the place of an actual occupant. The dummy P corresponds to a $50^{th}$ percentile adult American male (AM50) World Side Impact Dummy (WorldSID). The dummy P is seated on the vehicle seat 12 in a manner set out under side impact testing methods. A front-rear position of the vehicle seat 12 with respect to the vehicle and a recline angle of the seatback 16 with respect to the seat cushion 14 have been adjusted to a standard setting position corresponding to the manner of seating. In this state, the front-rear, left-right, and vertical directions of the seatback 16 correspond to the front-rear, left-right, and vertical directions of the vehicle.

The torso of the dummy P includes six rib pairs R1, R2, R3, R4, R5, R6. The rib pairs R1, R2, R3, R4, R5, R6 may be referred to as a "shoulder rib pair R1", an "upper chest rib pair R2", a "mid-chest rib pair R3", a "lower chest rib pair R4", an "upper abdominal rib pair R5", and a "lower abdominal rib pair R6" in sequence from the top downward. The shoulder rib pair R1 is provided corresponding to the shoulders S of the dummy P, the upper chest rib pair R2, the mid-chest rib pair R3, and the lower chest rib pair R4 are provided corresponding to the chest C of the dummy P, and the upper abdominal rib pair R5 and the lower abdominal rib pair R6 are provided corresponding to the abdomen B of the dummy P. In the following explanation, the dummy P is also referred to as the occupant P.

Figure 3:
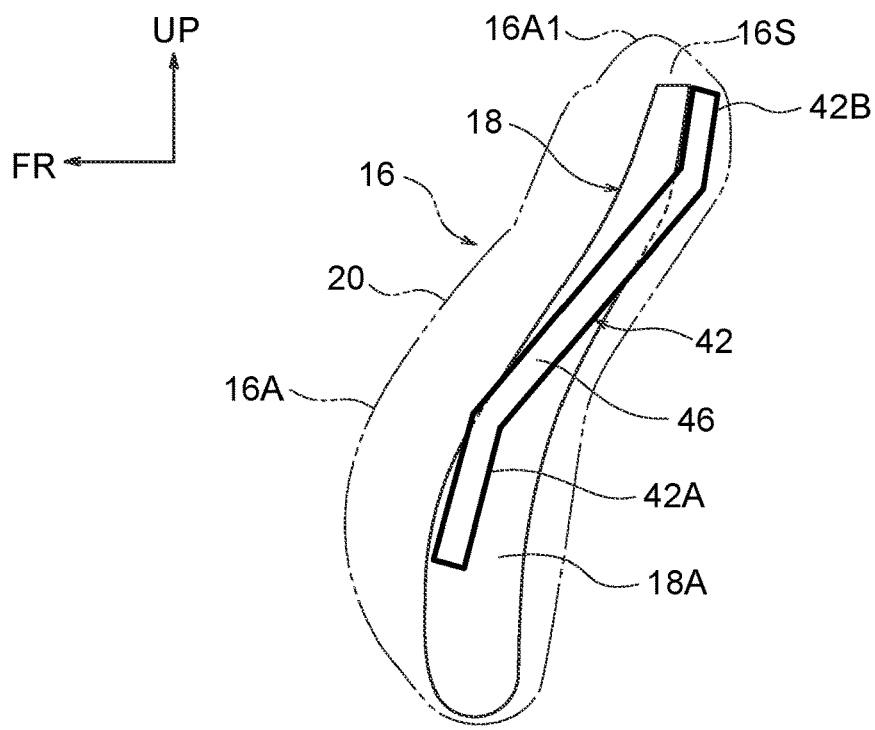
FIG. 3 is a side view illustrating a side airbag in a housed state.
Figure 4:
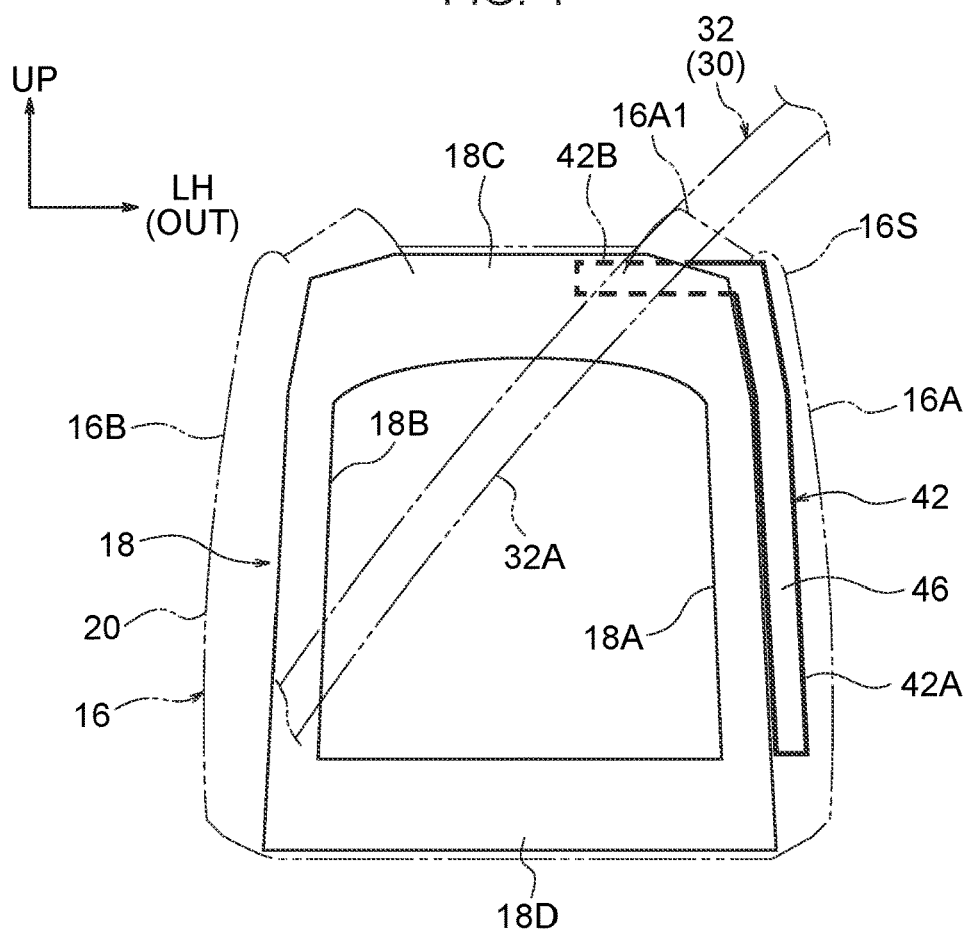
FIG. 4 is a front view illustrating a side airbag in a housed state.

As illustrated in FIG. 1, FIG. 3, and FIG. 4, the seatback 16 includes a seatback frame 18 configuring a framework member, a non-illustrated seatback pad enveloped by the seatback frame 18, and a seatback cover 20 covering the seatback pad. The seatback frame 18 is, for example, configured from a metal or a resin, and the seatback pad is, for example, configured from a foamed body such as urethane foam. The seatback cover 20 is, for example, configured from a fabric (woven material), a knit material (knitted material), synthetic leather, genuine leather, or the like, and is configured by stitching together plural cover pieces.

The seatback frame 18 includes an outer side frame 18A extending along the vehicle vertical direction at the inner side of a side section 16A on the vehicle width direction outer side of the seatback 16, and an inner side frame 18B extending along the vehicle vertical direction at a side section 16B on the vehicle width direction inner side of the seatback 16. The seatback frame 18 further includes an upper frame 18C linking upper ends of the outer side frame 18A and the inner side frame 18B together, and a lower frame 18D linking lower ends of the outer side frame 18A and the inner side frame 18B together in the seat width direction. The side section 16A is a location on the vehicle width direction outer side of the seatback 16 that includes a side support section on the vehicle width direction outer side. An upper face 16A1 of the side section 16A configures part of an upper face of the seatback 16. The side section 16A corresponds to a "side section on a vehicle width direction outer side of a seatback" of the present disclosure, and the outer side frame 18A corresponds to a "side frame" of the present disclosure. In the following explanation, the side section 16A will be referred to as the outer-side side section 16A.

Vehicle Seatbelt Device Configuration

As illustrated in FIG. 1, the vehicle seatbelt device 30 includes a three-point seatbelt (webbing) 32 for occupant restraint. Note that only a shoulder belt 32A part of the seatbelt 32 is illustrated in FIG. 1.

One non-illustrated length direction end portion of the seatbelt 32 is anchored to a non-illustrated anchor plate fixed to a vehicle body floor or the like at the vehicle width direction outer side of the vehicle seat 12 (on the left side in this example). Another non-illustrated end portion of the seatbelt 32 is anchored to a take-up shaft of a non-illustrated retractor (webbing take-up device) installed at a lower section of a B-pillar or the like of the vehicle. An intermediate portion of the seatbelt 32 is inserted through a non-illustrated shoulder anchor installed at an upper section of the B-pillar or the like so as to fold back on itself. A non-illustrated tongue plate is attached to a portion of the seatbelt 32 between the shoulder anchor and the anchor plate so as to be capable of sliding along the seatbelt 32. The tongue plate is couplable to a non-illustrated buckle device attached to a lower end portion or the like of the vehicle seat 12 on the vehicle width direction inner side of the vehicle seat 12 (on the right side in this example). The seatbelt 32 is worn over the occupant P in this manner. In this worn state of the seatbelt, the shoulder belt 32A, corresponding to a location of the seatbelt 32 between the shoulder anchor and the tongue plate, restrains the chest C and the abdomen B of the occupant P. Moreover, in the worn state of the seatbelt, a non-illustrated lap belt, corresponding to a location of the seatbelt 32 between the tongue plate and the anchor plate, restrains the waist W of the occupant P.

Vehicle Side Airbag Device Configuration

As illustrated in FIG. 1 and FIG. 2, the vehicle side airbag device 40 includes an inflator 44, a side airbag 46, and a duct 48. The inflator 44 generates gas on actuation, and the side airbag 46 inflates and deploys at a side of the occupant P on receiving of a supply of gas from the inflator 44 (see the state illustrated in FIG. 1 and FIG. 2). The duct 48 is accommodated inside the side airbag 46, and is configured to distribute the gas generated by the inflator 44 between an upper section and lower section of the side airbag 46.

The inflator 44, the side airbag 46, and the duct 48 are configured as a side airbag module 42 illustrated in FIG. 3 and FIG. 4 under everyday circumstances. The side airbag module 42 is housed inside the outer-side side section 16A of the seatback 16. In the following explanation, front-rear and vertical directions of the side airbag 46 refer to these directions in an inflated and deployed state of the side airbag 46, and are substantially aligned with the front-rear and vertical directions of the seatback 16.

As illustrated in FIG. 1, the inflator 44 is what is referred to as a cylinder-type inflator, and is formed in a circular columnar shape. The inflator 44 is installed at the vehicle width direction outer side of the outer side frame 18A with an orientation such that an axial direction of the inflator 44 runs along a height direction of the seatback 16, namely an orientation sloping downward toward the front. As an example, the inflator 44 is disposed at a height in the vicinity of the abdomen B of the occupant P. A pair of upper and lower stud bolts (not illustrated in the drawings) project out from an outer circumferential portion of the inflator 44 toward the vehicle width direction inner side. The stud bolts are passed through the outer side frame 18A. Non-illustrated nuts are screwed onto the stud bolts. The inflator 44 is thus attached to the outer side frame 18A. Note that alternatively, stud bolts projecting out from the outer circumferential portion of the inflator 44 toward the vehicle rear side may be passed from the vehicle front side through a bracket or the like fixed to the outer side frame 18A, and nuts screwed onto these stud bolts (what is referred to as back-face fastening).

An upper end portion or a lower end portion of the inflator 44 (a lower end portion in this example) is provided with an gas ejection portion 44A. The gas ejection portion 44A is, for example, formed with plural gas ejection ports arranged around a circumferential direction of the inflator 44. When the inflator 44 is activated (actuated), gas is ejected in a radial pattern through the plural gas ejection ports. As illustrated in FIG. 1, a side-on collision ECU 60 installed to the vehicle is electrically connected to the inflator 44. A side-on collision sensor 62 configured to detect a side-on collision is electrically connected to the side collision ECU 60. The side-on collision ECU 60 is configured to activate the inflator 44 on detection of a side-on collision (i.e. on detection that a side-on collision is unavoidable) based on a signal from the collision sensor 62. Note that in cases in which a collision prediction sensor (pre-crash sensor) for predicting (foreseeing) a side-on collision is electrically connected to the side-on collision ECU 60, the inflator 44 may be activated upon the side-on collision ECU 60 predicting a side-on collision based on a signal from the collision prediction sensor.

As illustrated in FIG. 1 and FIG. 2, on receiving a supply of gas from the inflator 44, the side airbag 46 inflates and deploys between the occupant P and a vehicle body side section (a non-illustrated side door and B pillar). The side airbag 46 is formed in a bag shape by for example cutting out two pieces of base fabric from a sheet of nylon or polyester fabric, and then overlapping and stitching outer peripheral edges of these pieces of base fabric together. Note that the manufacturing method of the side airbag 46 is not limited to the above, and may be modified as appropriate. For example, the side airbag 46 may be manufactured by folding one piece of base fabric in two and stitching the outer peripheral edges thereof together. Alternatively, the side airbag 46 may be manufactured by a one-piece woven (OPW) process using automatic weaving machinery.

The side airbag 46 inflates and deploys in an elongated shape with its length along the height direction of the seatback 16. The side airbag 46 is formed with a size capable of restraining the occupant P from the head H to the waist W. The side airbag 46 is configured of integral chambers, these being a head chamber (head protection inflatable section) 46A that restrains the head H of the occupant P, a chest chamber (chest protection inflatable section) 46C that restrains the occupant P from a shoulder S to the abdomen B, a connecting chamber 46B that connects between the head chamber 46A and the chest chamber 46C, and a waist chamber (waist protection inflatable section) 46D that restrains the waist W of the occupant P.

As viewed along the vehicle width direction, a location of the side airbag 46 corresponding to the chest chamber 46C and the waist chamber 46D inflates and deploys in a substantially elliptical shape with its length along the height direction of the seatback 16. In the inflated and deployed state of the side airbag 46, a front edge of the chest chamber 46C slopes downward toward the front. The front edge of the chest chamber 46C makes sliding contact with an upper arm A of the occupant P, such that the upper arm A is pressed upward about the shoulder S. This prevents the upper arm A from becoming trapped between the chest C and abdomen B and the chest chamber 46C.

An inflator connecting portion 46E extends toward the vehicle rear side from a lower portion of a rear edge of the side airbag 46 (at a height corresponding to the waist W and the abdomen B of the occupant P in this example). An insertion hole for the inflator 44 is formed in an upper end portion of the inflator connecting portion 46E. The lower end portion of the inflator 44 is inserted into the inflator connecting portion 46E through this insertion hole.

As viewed along the vehicle width direction, the head chamber 46A of the side airbag 46 inflates and deploys in a substantially rectangular shape. The head chamber 46A mainly inflates and deploys further toward the head H of the occupant P (i.e. the vehicle width direction inner side) than the shoulder belt 32A of the seatbelt 32. In the present exemplary embodiment, on being inflated and deployed, the head chamber 46A opposes the head H of the occupant P from the vehicle width direction outer side so as to either contact or come close to the head H. In the inflated and deployed state, the head chamber 46A is disposed so as to overlap the neck N and substantially the lower half of the head H of the occupant P as viewed along the vehicle width direction.

An upper end portion of the connecting chamber 46B is integrally connected to substantially the upper half of a rear edge of the head chamber 46A. The connecting chamber 46B is formed in a substantially circular tubular shape. A lower end portion of the connecting chamber 46B is integrally connected to an upper end portion of the chest chamber 46C. The interior of the chest chamber 46C and the interior of the head chamber 46A are placed in communication with each other via the interior of the connecting chamber 46B. As viewed along the vehicle front-rear direction, the connecting chamber 46B inflates and deploys so as to slope toward the vehicle width direction inner side on progression toward the vehicle upper side. The connecting chamber 46B inflates and deploys at the vehicle lower side of the shoulder belt 32A of the seatbelt 32.

As illustrated in FIG. 1 and FIG. 2, the duct 48 is accommodated inside the side airbag 46. The duct 48 has a function of guiding gas from the inflator 44 into the waist chamber 46D and into the head chamber 46A. The duct 48 is configured by a duct main body 48A formed in a circular tubular shape, and an inflator connecting portion 48B that extends from a lower end portion side of the duct main body 48A toward the vehicle rear side. The duct main body 48A is accommodated inside a rear portion of the side airbag 46 so as to be orientated with its axial direction along the vertical direction of the side airbag 46. The duct main body 48A extends from an upper end portion to a lower end portion inside the side airbag 46. An upper side ejection port 50, configuring an upper side opening, is formed in an upper end portion of the duct main body 48A. A lower side ejection port 52, configuring a lower side opening, is formed in the lower end portion of the duct main body 48A. The upper side ejection port 50 opens into a rear end portion inside the head chamber 46A, namely in the vicinity of a connecting portion between the head chamber 46A and the connecting chamber 46B. The lower side ejection port 52 opens into the waist chamber 46D.

The inflator connecting portion 48B corresponds to a "connecting portion" of the present disclosure. The inflator connecting portion 48B is accommodated inside the inflator connecting portion 46E of the side airbag 46, and is superimposed on the inner side of the inflator connecting portion 46E. An insertion hole for the inflator 44 is formed in an upper end portion of the inflator connecting portion 48B. This insertion hole is disposed inside the insertion hole formed in the upper end portion of the inflator connecting portion 46E, and the lower end portion of the inflator 44 is inserted into the inflator connecting portion 48B through this insertion hole.

As previously described, under everyday circumstances, the inflator 44, the side airbag 46, and the duct 48 configure the side airbag module 42 illustrated in FIG. 3 and FIG. 4, and are housed inside the outer-side side section 16A. The side airbag 46 of the side airbag module 42 is folded together with the duct 48 into an elongated shape using a predetermined folding method. In a housed state, a location of the side airbag 46 including the head chamber 46A extends from a shoulder part 16S (only appended reference numerals in FIG. 3 and FIG. 4) of the seatback 16 toward the headrest 22. Specifically, in the housed state, the side airbag 46 bends at the height of the shoulder part 16S of the seatback 16 so as to be configured by a vertical extending portion 42A that extends along the height direction of the seatback 16 at the vehicle width direction outer side of the outer side frame 18A, and a lateral extending portion 42B that extends along the vehicle width direction at the vehicle rear side of the upper frame 18C. The vertical extending portion 42A is configured by a location of the side airbag 46 that mainly corresponds to the chest chamber 46C and the waist chamber 46D, whereas the lateral extending portion 42B is configured by a location of the side airbag 46 that mainly corresponds to the head chamber 46A and the connecting chamber 46B. As illustrated in FIG. 4, a vehicle width direction inner side end portion of the lateral extending portion 42B is disposed further toward the vehicle width direction inner side than the shoulder belt 32A. Note that illustration of the inflator 44 is omitted from FIG. 3 and FIG. 4.

In the vehicle side airbag device 40 with the above configuration, when the inflator 44 is actuated, gas ejected through the gas ejection portion 44A of the inflator 44 flows into the duct main body 48A through the inflator connecting portion 48B. Gas that has flowed into the duct main body 48A is ejected into the waist chamber 46D and into the head chamber 46A through the lower side ejection port 52 and the upper side ejection port 50 of the duct main body 48A respectively. Some of the gas ejected into the waist chamber 46D and into the head chamber 46A flows into the chest chamber 46C. The side airbag 46 thereby inflates and deploys toward the side of the occupant P.

During this inflation and deployment, a tear line portion (burst line portion; scheduled rupture portion) set in the seatback cover 20 and located between at least one out of a front face or a side face (neither of which are allocated reference numerals) of the outer-side side section 16A and the upper face 16A1 side of the outer-side side section 16A bursts open. The "upper face 16A1 side" includes at least one out of the upper face 16A1 or a portion peripheral to the upper face 16A1 (such as an upper end portion of a back face of the outer-side side section 16A). The side airbag 46 inflates and deploys toward the outside of the outer-side side section 16A as a result of this bursting open. When this occurs, the waist chamber 46D inflates and deploys through a lower portion of the outer-side side section 16A toward the side of the waist W, and the chest chamber 46C inflates and deploys through a vertical direction intermediate portion of the outer-side side section 16A toward the sides of the shoulder S, chest C, and abdomen B. At the same time, the head chamber 46A inflates and deploys through the upper face 16A1 side of the outer-side side section 16A toward the sides of the head H and neck N, and the connecting chamber 46B inflates and deploys through the upper end portion of the outer-side side section 16A obliquely toward the vehicle upper-rear side with respect to the shoulder S.

Figure 5:
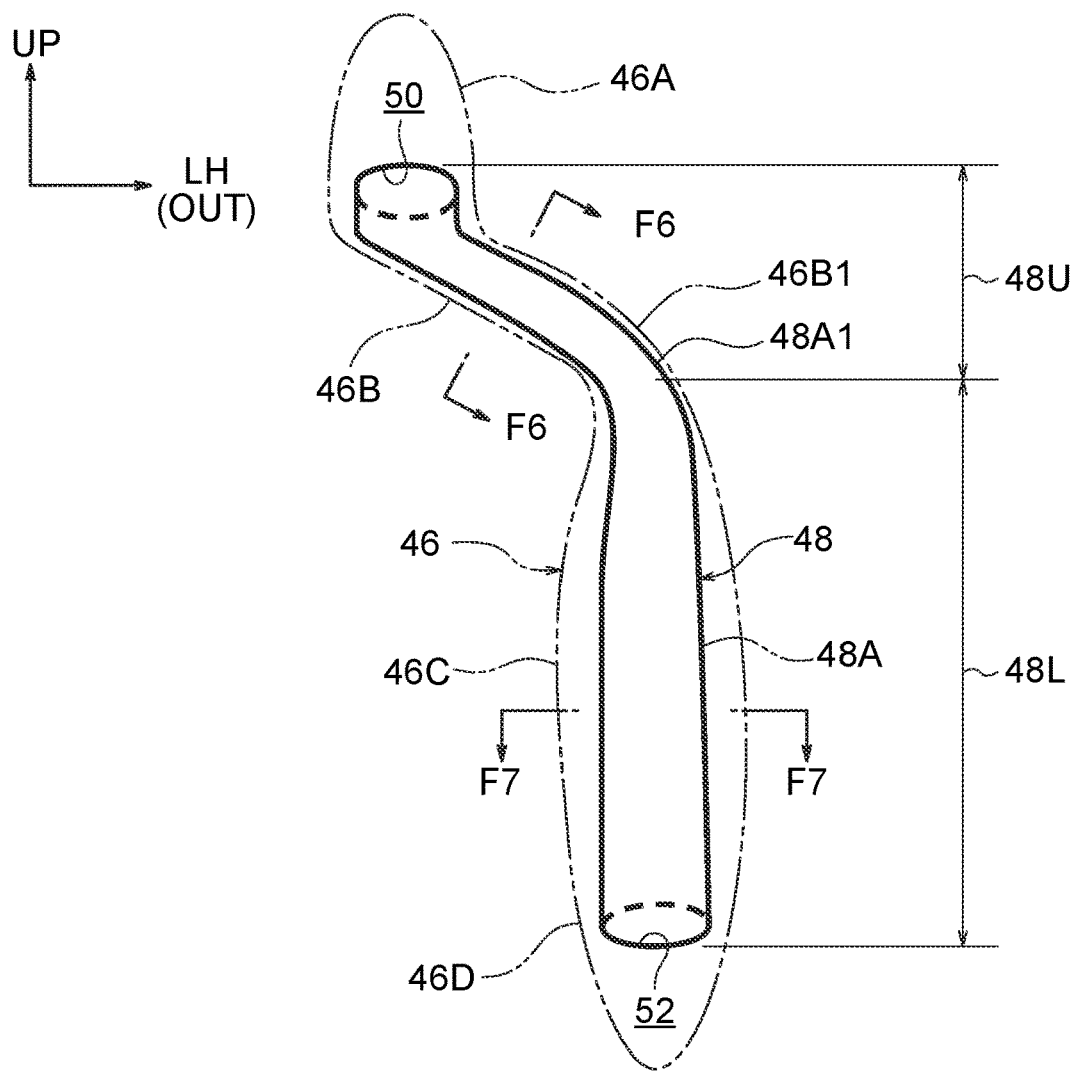
FIG. 5 is a front view illustrating a duct in an inflated and deployed state.
Figure 6:
FIG. 6 is a cross-section sectioned along line F6-F6 in FIG. 5.
Figure 7:
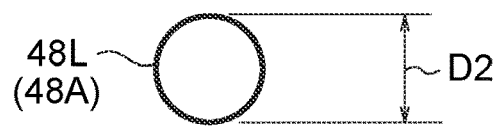
FIG. 7 is a cross-section sectioned along line F7-F7 in FIG. 5.

During this inflation and deployment of the side airbag 46, the duct main body 48A extends along the vertical direction of the side airbag 46 inside the side airbag 46. As illustrated in FIG. 2, the connecting chamber 46B of the side airbag 46 and the duct main body 48A are configured so as to bend at bend portions 46B1, 48A1 (see FIG. 2; reference numerals are omitted in FIG. 1) positioned at the height of the shoulder part 16S of the seatback 16 during this inflation and deployment of the side airbag 46. The connecting chamber 46B and the duct main body 48A are inclined toward the vehicle width direction inner side at the vehicle upper side of the bend portions 46B1, 48A1, such that the head chamber 46A is disposed further toward the vehicle width direction inner side than the chest chamber 46C and the waist chamber 46D. Moreover, as illustrated in FIG. 5, a cross-section area of a location 48U of the duct main body 48A further toward an upper end side than the bend portion 48A1 is set smaller than a cross-section area of a location 48L of the duct main body 48A further toward a lower end side than the bend portion 48A1. Namely, a diameter D1 (see FIG. 6) of a circular cross-section of the upper end side location 48U is set smaller than a diameter D2 (see FIG. 7) of a circular cross-section of the lower end side location 48L (i.e. D1<D2).

Figure 8:
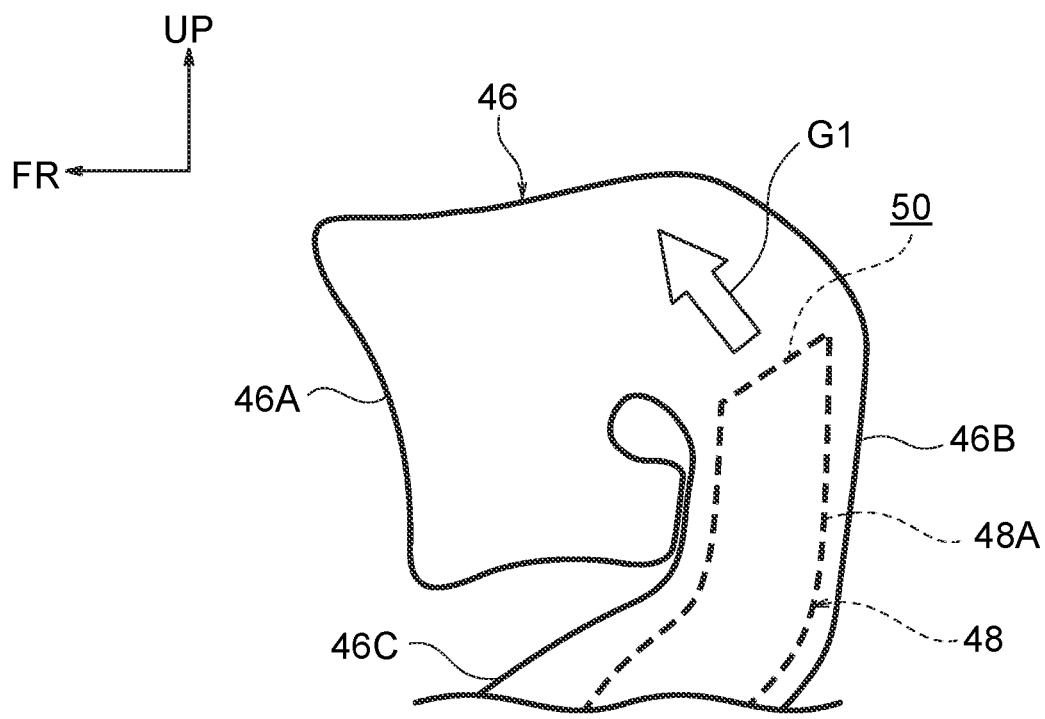
FIG. 8 is a side view corresponding to part of FIG. 1, for explaining an ejection direction of gas through an upper side ejection port of a duct.

As illustrated in FIG. 1 and FIG. 2, the upper side ejection port 50 formed in the upper end portion of the duct main body 48A is set so as to open into the head chamber 46A, and to open further toward the head H of the occupant P than the shoulder belt 32A of the seatbelt 32, during inflation and deployment of the side airbag 46. Specifically, the upper side ejection port 50 is set so as to open at a space between a side face 22S on the vehicle width direction outer side of the headrest 22, the shoulder belt 32A, and the upper end portion of the outer-side side section 16A during inflation and deployment of the side airbag 46. The upper side ejection port 50 is disposed adjacent to the vehicle front side and vehicle width direction outer side of a stay 22A (see FIG. 2; not illustrated in FIG. 1) of the headrest 22 during inflation and deployment of the side airbag 46. As illustrated in FIG. 1, the upper side ejection port 50 is cut at an angle so as to open obliquely toward the vehicle upper-front side during inflation and deployment of the side airbag 46. Gas is thereby ejected obliquely toward the vehicle upper-front side inside the head chamber 46A through the upper side ejection port 50 (see the arrow G1 in FIG. 8).

Figure 9:
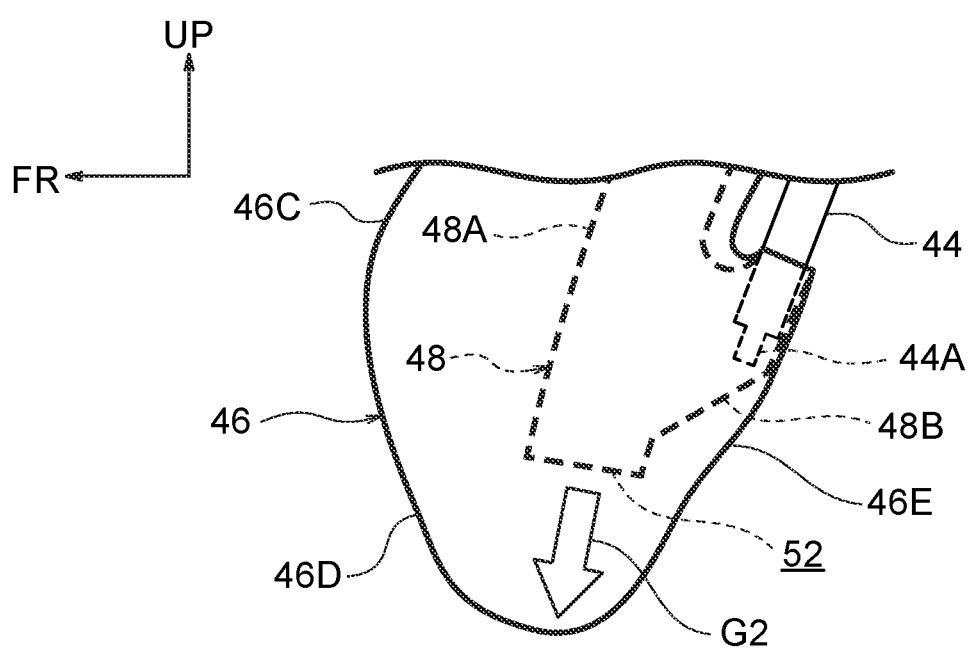
FIG. 9 is a side view corresponding to part of FIG. 1, for explaining an ejection direction of gas through a lower side ejection port of a duct.

As illustrated in FIG. 1 and FIG. 2, the lower side ejection port 52 formed in the lower end portion of the duct main body 48A opens into the waist chamber 46D during inflation and deployment of the side airbag 46, and is set such that the entire lower side ejection port 52 is positioned at the side of the waist W of the occupant P. The lower side ejection port 52 is formed so as to open toward the vehicle lower side (toward the vehicle lower side and slightly toward the vehicle front side in this example) during inflation and deployment of the side airbag 46. Gas is thereby ejected toward the vehicle lower side inside the waist chamber 46D through the lower side ejection port 52 (see the arrow G2 in FIG. 9).

As illustrated in FIG. 1, the inflator connecting portion 48B that extends from the lower end portion side of the duct main body 48A is connected to the lower end portion of the inflator 44. Thus, when the inflator 44 is actuated (activated), gas ejected through the gas ejection portion 44A provided at the lower end portion of the inflator 44 is ejected into the waist chamber 46D through the lower side ejection port 52 formed in the lower end portion of the duct main body 48A at an early stage. Gas ejected through the gas ejection portion 44A also flows toward the upper end portion of the duct main body 48A, and is ejected into the head chamber 46A through the upper side ejection port 50 of the duct main body 48A. Thus, the duct main body 48A is configured so as to extend along the height direction of the seatback 16 (i.e. the vertical direction of the side airbag 46) at the vehicle front side of the inflator 44 when the side airbag 46 inflates and deploys. The duct 48 is at a relatively high pressure inside the side airbag 46 due to the gas being introduced from the inflator 44. Substantially the rear half of the chest C of the occupant P is restrained from the side by this high pressure duct 48.

Operation and Effects

Next, explanation follows regarding operation and effects of the present exemplary embodiment.

In the present exemplary embodiment, the occupant P is restrained in the vehicle seat 12 using the three-point seatbelt 32. The vehicle side airbag device 40 is installed at the outer-side side section 16A of the seatback 16 of the vehicle seat 12. In this vehicle side airbag device 40, the inflator 44 is activated by the collision ECU 60 when the collision ECU 60 detects a side-on collision based on a signal from the collision sensor 62. As a result, gas generated by the inflator 44 flows into the duct main body 48A of the duct 48 via the inflator connecting portion 48B of the duct 48. The duct main body 48A extends along the vertical direction of the side airbag 46 inside the side airbag 46. Gas is ejected into the waist chamber 46D and into the head chamber 46A through the lower side ejection port 52 and the upper side ejection port 50 respectively formed in the lower end portion and the upper end portion of the duct main body 48A. Thus, the waist chamber 46D inflates and deploys from the lower portion of the outer-side side section 16A toward the side of the waist W of the occupant P, and the head chamber 46A inflates and deploys from the upper face 16A1 side of the outer-side side section 16A toward the side of the head H of the occupant P.

As a result of providing the duct 48, the force of gas from the inflator 44 is more readily applied to the head chamber 46A during this inflation and deployment, facilitating inflation and deployment of the head chamber 46A from the upper face 16A1 side of the outer-side side section 16A. The head chamber 46A inflates and deploys more readily further toward the vehicle width direction inner side (i.e. further toward the head H of the occupant P) than the shoulder belt 32A of the seatbelt 32 as a result. This enables an inflation and deployment position of the head chamber 46A to be brought closer to the head H, thereby enabling initial restraint performance with respect to the head H to be enhanced. Moreover, the head H bears reaction force from the shoulder belt 32A through the head chamber 46A, thereby enabling the internal pressure of the head chamber 46A to be set to a low level. This enables the vehicle width direction thickness (volume) of the head chamber 46A to be reduced, thereby contributing to early inflation and deployment of the head chamber 46A. Moreover, since the head chamber 46A can be pressed by the shoulder belt 32A, the head H can also be restrained without delay in an oblique side-on collision or the like.

Moreover, in the present exemplary embodiment, the upper side ejection port 50 of the duct 48 opens into the head chamber 46A and opens further toward the head H of the occupant P than the shoulder belt 32A of the seatbelt 32 during inflation and deployment of the side airbag 46. The force of gas ejected into the head chamber 46A through the upper side ejection port 50 is applied to the head chamber 46A that is further toward the head H than the shoulder belt 32A. Namely, when the upper side ejection port 50 opens in the above manner, the force of gas is concentrated at a desired inflation and deployment location of the head chamber 46A. This further facilitates inflation and deployment of the head chamber 46A further toward the head H than the shoulder belt 32A.

Moreover, in the present exemplary embodiment, the upper side ejection port 50 of the duct 48 opens in the space between the side face 22S at the vehicle width direction outer side of the headrest 22 of the vehicle seat 12, the shoulder belt 32A of the seatbelt 32, and the upper end portion of the outer-side side section 16A of the seatback 16 during inflation and deployment of the side airbag 46. The head chamber 46A inflates and deploys under the force of gas ejected through the upper side ejection port 50, thereby facilitating inflation and deployment of the head chamber 46A in the narrow space between the side face 22S of the headrest 22, the shoulder belt 32A, and the upper end portion of the outer-side side section 16A.

Moreover, in the present exemplary embodiment, the upper side ejection port 50 of the duct 48 is positioned adjacent to the stay 22A of the headrest 22 of the vehicle seat 12 during inflation and deployment of the side airbag 46. The head chamber 46A inflates and deploys under the force of gas ejected through the upper side ejection port 50, thereby making it easier to set the inflation and deployment position of the head chamber 46A closer to the head H.

Moreover, in the present exemplary embodiment, the lower side ejection port 52 of the duct 48 opens into the waist chamber 46D during inflation and deployment of the side airbag 46. This enables the waist chamber 46D be inflated and deployed at an early stage under the force of gas ejected through the lower side ejection port 52. This enables initial restraint performance with respect to the waist W by the waist chamber 46D to be enhanced.

Moreover, in the present exemplary embodiment, the entire lower side ejection port 52 of the duct 48 is positioned at the side of the waist W during inflation and deployment of the side airbag 46. This enables the waist chamber 46D to be inflated and deployed between the waist W and the vehicle body side section at an early stage under the force of gas ejected through the lower side ejection port 52.

Moreover, in the present exemplary embodiment, in a state in which the side airbag 46 is folded and housed inside the outer-side side section 16A of the seatback 16, a location of the side airbag 46 including the head chamber 46A extends from the shoulder part 16S of the seatback 16 toward the headrest 22. By housing the head chamber 46A in this manner, the head chamber 46A that inflates and deploys from the upper face 16A1 side of the outer-side side section 16A more readily inflates and deploys further toward the head H than the shoulder belt 32A.

Moreover, in the present exemplary embodiment, the duct main body 48A bends at the bend portion 48A1 positioned at the height of the shoulder part 16S of the seatback 16 during inflation and deployment of the side airbag 46. The cross-section area of the location 48U of the duct main body 48A further toward the upper end side than the bend portion 48A1 is set smaller than the cross-section area of the location 48L of the duct main body 48A further toward the lower end side than the bend portion 48A1. The duct main body 48A bends more readily at the bend portion 48A1 as a result, making it easier to bring the upper end side location 48U of the duct 48 closer to the head H.

Moreover, in the present exemplary embodiment, the upper side ejection port 50 formed at the upper end portion of the duct main body 48A opens obliquely toward the vehicle upper-front side inside the head chamber 46A during inflation and deployment of the side airbag 46. This enables the head chamber 46A to be inflated and deployed obliquely toward the vehicle upper-front side from the upper face 16A1 side of the outer-side side section 16A under the force of gas ejected through the upper side ejection port 50. This promotes early inflation and deployment of the head chamber 46A toward the head H.

Moreover, in the present exemplary embodiment, the lower side ejection port 52 formed at the lower end portion of the duct main body 48A opens toward the vehicle lower side inside the waist chamber 46D during inflation and deployment of the side airbag 46. This promotes early inflation and deployment of the waist chamber 46D in a narrow gap between the waist W and the vehicle body side section under the force of gas ejected through the lower side ejection port 52.

Moreover, in the present exemplary embodiment, the inflator connecting portion 48B of the duct 48 is connected to the gas ejection portion 44A of the inflator 44 that is fixed to the outer side frame 18A of the seatback 16. Gas from the inflator 44 is introduced into the duct 48 in this manner. The duct main body 48A of the duct 48 extends along the height direction of the seatback 16 further toward the vehicle front side than the inflator 44 during inflation and deployment of the side airbag 46. The duct main body 48A is at a relatively high pressure inside the side airbag 46 due to gas being introduced into the duct main body 48A from the inflator 44. Since the high pressure duct main body 48A extends in the above-described manner, for example a rear part of the ribs of the occupant P can be more effectively restrained by the duct main body 48A.

Moreover, in the present exemplary embodiment, the inflator connecting portion 48B that extends from the lower end portion side of the duct main body 48A is connected to the gas ejection portion 44A provided at the lower end portion of the inflator 44. Thus, gas from the inflator 44 is supplied into the waist chamber 46D via the duct 48 at an early stage. This enables the waist chamber 46D to be inflated and deployed at an earlier stage than the head chamber 46A, such that the waist chamber 46D is more readily inflated and deployed at an earlier stage in the narrow gap between the waist W of the occupant P and the vehicle body side section.

Supplementary Explanation of Exemplary Embodiment

Although a configuration has been described in which the lower side ejection port 52 of the duct 48 opens toward the vehicle lower side during inflation and deployment of the side airbag 46 in the above exemplary embodiment, there is no limitation thereto. The lower side ejection port 52 may open obliquely toward the vehicle lower-front side or obliquely toward the vehicle lower-rear side.

Although a configuration has been described in which the entire lower side ejection port 52 of the duct 48 is positioned at the side of the waist W during inflation and deployment of the side airbag 46 in the above exemplary embodiment, there is no limitation thereto. For example, configuration may be such that only part of the lower side ejection port 52 is positioned at the side of the waist W.

Although a configuration has been described in which the upper side ejection port 50 of the duct 48 opens obliquely toward the vehicle upper-front side during inflation and deployment of the side airbag 46 in the above exemplary embodiment, there is no limitation thereto. The upper side ejection port 50 may open toward the vehicle upper side.

Although a configuration has been described in which the upper side ejection port 50 of the duct 48 opens in the space between the side face 22S of the headrest 22, the shoulder belt 32A, and the upper end portion of the outer-side side section 16A, and is positioned adjacent to the stay 22A during inflation and deployment of the side airbag 46 in the above exemplary embodiment, there is no limitation thereto. For example, the upper side ejection port 50 of the duct 48 may open in the vicinity of the shoulder part 16S of the seatback 16.

Although the cross-section area of a location of the duct main body 48A of the duct 48 further toward the upper end side than the bend portion 48A1 is set smaller than the cross-section area of a location of the duct main body 48A further toward the lower end side than the bend portion 48A1 in the above exemplary embodiment, there is no limitation thereto. For example, the cross-section area of the duct main body 48A may be set as a constant area from the upper end as far as the lower end of the duct main body 48A.

Although the gas ejection portion 44A is provided to the lower end portion of the inflator 44 in the above exemplary embodiment, there is no limitation thereto. A gas ejection portion may be provided to the upper end portion of the inflator 44. In such cases, the inflator connecting portion 48B of the duct 48 may extend from a vertical direction intermediate portion of the duct main body 48A.

Although a configuration has been described in which the duct 48 extends along the vertical direction of the seatback 16 further toward the vehicle front side than the inflator 44 during inflation and deployment of the side airbag 46 in the above exemplary embodiment, there is no limitation thereto. The entire inflator may be accommodated inside a duct.

Various other modifications to the present disclosure may be implemented within a range not departing from the spirit thereof. Obviously the scope of rights of the present disclosure is not limited by the above exemplary embodiment.

What is claimed is:

1. A vehicle side airbag device installed at a side section on a vehicle width direction outer side of a seatback of a vehicle seat configured to restrain an occupant using a three-point seatbelt, the vehicle side airbag device comprising:
    an inflator configured to generate gas in a vehicle side-on collision;
    a side airbag including a waist chamber configured to inflate and deploy from a lower portion of the side section toward a side of a waist of the occupant on receiving a supply of gas from the inflator, and a head chamber configured to inflate and deploy from an upper face side of the side section toward a side of a head of the occupant on receiving a supply of gas from the inflator; and
    a duct that extends along a vertical direction of the side airbag inside the side airbag, and is configured to guide gas from the inflator into the waist chamber and into the head chamber,
    an upper side ejection port is formed at an upper end portion of the duct so as to open into the head chamber and to open further toward the head of the occupant than a shoulder belt of the seatbelt during inflation and deployment of the side airbag, and the upper side ejection port of the duct is set so as to open at a space between a side face of a headrest of the vehicle seat, the shoulder belt, and an upper end portion of the side section during inflation and deployment of the side airbag.

2. The vehicle side airbag device of claim 1, wherein a lower side ejection port is formed at a lower end portion of the duct so as to open into the waist chamber during inflation and deployment of the side airbag.

3. The vehicle side airbag device of claim 2, wherein the lower side ejection port is set such that the entire lower side ejection port is positioned at the side of the waist of the occupant during inflation and deployment of the side airbag.

4. The vehicle side airbag device of claim 1, wherein:
    the side airbag is housed inside the side section in a folded state; and
    in a housed state of the side airbag, a location including the head chamber extends from a shoulder part of the seatback toward the headrest.

5. The vehicle side airbag device of claim 4, wherein:
    the duct is arranged so as to bend at a height of the shoulder part of the seatback during inflation and deployment of the side airbag; and
    a cross-section area of a location of the duct further toward an upper end side than a location of the bend is set smaller than a cross-section area of a location of the duct further toward a lower end side than the location of the bend.

6. The vehicle side airbag device of claim 1, wherein the upper side ejection port of the duct is set so as to open obliquely toward a vehicle upper-front side during inflation and deployment of the side airbag.

7. The vehicle side airbag device of claim 2, wherein the lower side ejection port of the duct is set so as to open toward a vehicle lower side during inflation and deployment of the side airbag.

8. The vehicle side airbag device of claim 1, wherein:
    the inflator is fixed to a side frame of the seatback;
    a connecting portion extending from the duct is connected to a gas ejection portion of the inflator; and
    the duct extends along a height direction of the seatback further toward a vehicle front side than the inflator during inflation and deployment of the side airbag.

9. The vehicle side airbag device of claim 8, wherein:
    the inflator is a cylinder-type inflator arranged with an orientation such that an axial direction of the inflator runs along the height direction of the seatback;
    the gas ejection portion is provided at a lower end portion of the inflator; and
    the connecting portion of the duct extends from a lower end portion side of the duct.

10. An occupant protection device comprising:
a vehicle seat including a seat cushion and a seatback;
a vehicle seatbelt device including a three-point seatbelt configured to restrain an occupant in the vehicle seat; and
the vehicle side airbag device of any one of claim 1 installed at a side section at a vehicle width direction outer side of the seatback.

11. A vehicle side airbag device installed at a side section on a vehicle width direction outer side of a seatback of a vehicle seat configured to restrain an occupant using a three-point seatbelt, the vehicle side airbag device comprising:
an inflator configured to generate gas in a vehicle side-on collision;
a side airbag including a waist chamber configured to inflate and deploy from a lower portion of the side section toward a side of a waist of the occupant on receiving a supply of gas from the inflator, and a head chamber configured to inflate and deploy from an upper face side of the side section toward a side of a head of the occupant on receiving a supply of gas from the inflator; and
a duct that extends along a vertical direction of the side airbag inside the side airbag, and is configured to guide gas from the inflator into the waist chamber and into the head chamber,
wherein an upper side ejection port is formed at an upper end portion of the duct so as to open into the head chamber and to open further toward the head of the occupant than a shoulder belt of the seatbelt during inflation and deployment of the side airbag, and the upper side ejection port of the duct is set so as to be positioned adjacent to a stay of a headrest during inflation and deployment of the side airbag.

12. A vehicle side airbag device installed at a side section on a vehicle width direction outer side of a seatback of a vehicle seat configured to restrain an occupant using a three-point seatbelt, the vehicle side airbag device comprising:
an inflator configured to generate gas in a vehicle side-on collision;
a side airbag including a waist chamber configured to inflate and deploy from a lower portion of the side section toward a side of a waist of the occupant on receiving a supply of gas from the inflator, and a head chamber configured to inflate and deploy from an upper face side of the side section toward a side of a head of the occupant on receiving a supply of gas from the inflator; and
a duct that extends along a vertical direction of the side airbag inside the side airbag, and is configured to guide gas from the inflator into the waist chamber and into the head chamber; wherein
an upper ejection port of the duct opens inward in the seat width direction from a shoulder belt in a front view;
the side airbag is housed inside the side section in a folded state; and
in a housed state of the side airbag, a location including the head chamber extends from a shoulder part of the seatback toward a headrest.

13. The vehicle side airbag device of claim 12, wherein:
the duct is arranged so as to bend at a height of the shoulder part of the seatback during inflation and deployment of the side airbag; and
a cross-sectional area of a location of the duct further toward an upper end side than a location of the bend is set smaller than a cross-section area of a location of the duct further toward a lower end side than the location of the bend.

14. The vehicle side airbag device of claim 1, wherein
the duct has a duct main body formed in a circular tubular shape, and is accommodated in the side airbag, and
the upper side ejection port of the duct opens inward in the seat width direction from the shoulder belt in a front view.

* * * * *